(12) United States Patent
Dallesasse

(10) Patent No.: US 7,941,053 B2
(45) Date of Patent: May 10, 2011

(54) OPTICAL TRANSCEIVER FOR 40 GIGABIT/SECOND TRANSMISSION

(75) Inventor: John Dallesasse, Geneva, IL (US)

(73) Assignee: Emcore Corporation, Albuquerque, NM (US)

( * ) Notice: Subject to any disclaimer, the term of this patent is extended or adjusted under 35 U.S.C. 154(b) by 631 days.

(21) Appl. No.: 11/551,047

(22) Filed: Oct. 19, 2006

(65) Prior Publication Data

US 2008/0095541 A1   Apr. 24, 2008

(51) Int. Cl.
H04B 10/04 (2006.01)

(52) U.S. Cl. ........ 398/139; 398/135; 398/138; 398/140; 398/141

(58) Field of Classification Search ............ 398/25, 398/29, 139; 359/196, 198; 385/15, 16, 385/17

See application file for complete search history.

(56) References Cited

U.S. PATENT DOCUMENTS

| | | | | | |
|---|---|---|---|---|---|
| 4,193,664 | A * | 3/1980 | Ellwood | | 385/65 |
| 6,449,069 | B1 * | 9/2002 | Fujita | | 398/43 |
| 6,501,781 | B1 * | 12/2002 | Maurer et al. | | 372/75 |
| 7,106,968 | B2 * | 9/2006 | Lahav et al. | | 398/47 |
| 7,203,426 | B2 * | 4/2007 | Wu et al. | | 398/135 |
| 7,286,572 | B2 * | 10/2007 | Hornbuckle et al. | | 370/537 |
| 7,346,082 | B2 * | 3/2008 | Ghiasi et al. | | 370/539 |
| 7,373,087 | B2 * | 5/2008 | Shi et al. | | 398/147 |
| 7,380,993 | B2 * | 6/2008 | Dallesasse | | 385/89 |
| 7,577,171 | B2 * | 8/2009 | Nejad et al. | | 370/539 |
| 2001/0004289 | A1 * | 6/2001 | Lee et al. | | 359/110 |
| 2002/0063926 | A1 * | 5/2002 | Nishi et al. | | 359/128 |
| 2002/0089719 | A1 * | 7/2002 | Joo et al. | | 359/127 |
| 2002/0126346 | A1 * | 9/2002 | Suzuki et al. | | 359/123 |
| 2003/0020981 | A1 * | 1/2003 | Vujkovic-Cvijin | | 359/124 |
| 2004/0068593 | A1 * | 4/2004 | Helenic et al. | | 710/71 |
| 2004/0078494 | A1 * | 4/2004 | Lennox et al. | | 710/1 |
| 2004/0156572 | A1 * | 8/2004 | Richardson et al. | | 385/1 |
| 2004/0175177 | A1 * | 9/2004 | Lee et al. | | 398/72 |
| 2004/0225951 | A1 * | 11/2004 | Rose et al. | | 714/819 |
| 2005/0019036 | A1 * | 1/2005 | Soto et al. | | 398/135 |
| 2005/0047726 | A1 * | 3/2005 | Hodgson | | 385/79 |
| 2005/0084269 | A1 * | 4/2005 | Dallesasse et al. | | 398/135 |
| 2005/0105907 | A1 * | 5/2005 | Richardson et al. | | 398/79 |
| 2006/0189220 | A1 * | 8/2006 | Duval et al. | | 439/760 |
| 2007/0047963 | A1 * | 3/2007 | Dallesasse | | 398/147 |
| 2007/0050658 | A1 * | 3/2007 | Kuwata | | 713/503 |
| 2007/0154217 | A1 * | 7/2007 | Kim et al. | | 398/72 |
| 2008/0089693 | A1 * | 4/2008 | El-Ahmadi et al. | | 398/135 |

OTHER PUBLICATIONS

John Paul Mattia, An OC-768 Transponder for 40 and 43 Gb/s Short-Reach Links, IEEE, 2003, Big Bear Networks technical Team, Sunnyvale, California, p. 27-30.*

Article: Texas Instruments; CommsDesign an EE Times Community; Title: 10GBASE-LX4 Pushes Multimode Fiber Limits; file://C:\MyFiles\Emcore\show_Article.html; Aug. 24, 2006; pp. 1-13.

(Continued)

*Primary Examiner* — Ken N Vanderpuye
*Assistant Examiner* — Tanya Ngo

(57) ABSTRACT

An optical transceiver for converting and coupling an information-containing electrical signal with an optical fiber including a housing having an electrical connector with a plurality of XFI electrical interfaces for coupling with an external electrical cable or information system device and for transmitting and/or receiving an information-containing electrical signal having a data rate of at least 10 Gigabits per second on each interface, and a fiber optic connector adapted for coupling with an external optical fiber for transmitting and/or receiving an optical communications signal having a data rate at least 40 Gigabits per second; and at least one electro-optical subassembly in the housing for converting between an information-containing electrical signal and a modulated optical signal corresponding to the electrical signals.

20 Claims, 4 Drawing Sheets

OTHER PUBLICATIONS

Article: Cisco Systems; White Paper; Title: 10 Gigabit Ethernet Dense Wavelength-Division Multiplexing Interconnections in Enterprise Campus Networks; pp. 1-14.

Article: Journal of Lighwave Technology, vol. 20, No. 12; Title: Advanced Components and Sub-System Solutions for 40 Gb/s Transmission; Dec. 2002; pp. 2154-2181.

Article: InterPRO; Title: 10 Gigabit Ethernet Technology Overview; Table of Contents; pp. 1-11.

Article: Intel Technology Journal, vol. 8, Issue 2, Title: 10 Gb/s Optical Transceivers Fundamentals and Emerging Technologies; pp. 83-100; 2004.

* cited by examiner

OPTICAL TRANSCEIVER FOR 40 GIGABIT/SECOND TRANSMISSION

REFERENCE TO RELATED APPLICATIONS

This application is related to U.S. patent application Ser. No. 10/866,265 filed Jun. 14, 2004, now U.S. Pat. No. 7,137,744, assigned to the common assignee.

This application is related to U.S. patent application Ser. No. 11/522,198 filed Sep. 15, 2006, now U.S. Pat. No. 7,380,993, assigned to the common assignee.

BACKGROUND OF THE INVENTION

1. Field of the Invention

The invention relates to optical transceivers, and in particular to optical signal modulation techniques that provide a communications link between computers or communications units over optical fibers, such as used in high throughput fiber optic communications links in local and wide area networks and storage area networks.

2. Description of the Related Art

Communications networks have experienced dramatic growth in data transmission traffic in recent years due to worldwide Internet access, e-mail, and e-commerce. As Internet usage grows to include transmission of larger data files, including content such as full motion video on-demand (including HDTV), multi-channel high quality audio, online video conferencing, image transfer, and other broadband applications, the delivery of such data will place a greater demand on available bandwidth. The bulk of this traffic is already routed through the optical networking infrastructure used by local and long distance carriers, as well as Internet service providers. Since optical fiber offers substantially greater bandwidth capacity, is less error prone, and is easier to administer than conventional copper wire technologies, it is not surprising to see increased deployment of optical fiber in data centers, storage area networks, and enterprise computer networks for short range network unit to network unit interconnection.

Such increased deployment has created a demand for electrical and optical transceiver modules that enable data system units such as computers, storage units, routers, and similar devices to be optionally coupled by either an electrical cable or an optical fiber to provide a high speed, short reach (less than 50 meters) data link within the data center.

A variety of optical transceiver modules are known in the art to provide such interconnection that include an optical transmit portion that converts an electrical signal into a modulated light beam that is coupled to a first optical fiber, and a receive portion that receives a second optical signal from a second optical fiber and converts it into an electrical signal. The electrical signals are transferred in both directions over electrical connectors that interface with the network unit using a standard electrical data link protocol.

The optical transmitter section includes one or more semiconductor lasers and an optical assembly to focus or direct the light from the lasers into an optical fiber, which in turn, is connected to a receptable or connector on the transceiver to allow an external optical fiber to be connected thereto using a standard SC, FC or LC connector. The semiconductor lasers are typically packaged in a hermetically sealed can or similar housing in order to protect the laser from humidity or other harsh environmental conditions. The semiconductor laser chip is typically a distributed feedback (DFB) laser with dimensions of a few hundred microns to a couple of millimeters wide and 100-500 microns thick. The package in which they are mounted typically includes a heat sink or spreader, and has several electrical leads coming out of the package to provide power and signal inputs to the laser chips. The electrical leads are then soldered to the circuit board in the optical transceiver. The optical receive section includes an optical assembly to focus or direct the light from the optical fiber onto a photodetector, which, in turn, is connected to a transimpedance amplifier/limiter circuit on a circuit board. The photodetector or photodiode is typically packaged in a hermetically sealed package in order to protect it from harsh environmental conditions. The photodiodes are semiconductor chips that are typically a few hundred microns to a couple of millimeters wide and 100-500 microns thick. The package in which they are mounted is typically from three to six millimeters in diameter and two to five millimeters tall, and has several electrical leads coming out of the package. These electrical leads are then soldered to the circuit board containing the amplifier/limiter and other circuits for processing the electrical signal.

Optical transceiver modules are therefore packaged in a number of standard form factors which are "hot pluggable" into a rack mounted line card network unit or the chassis of the data system unit. Standard form factors set forth in Multi Source Agreements (MSAs) provide standardized dimensions and input/output interfaces that allow devices from different manufacturers to be used interchangeably. Some of the most popular MSAs include XENPAK (see www.xenpak.org), X2 (see www.X2msa.org), SFF ("small form factor"), SFP ("small form factor pluggable"), and XFP ("10 Gigabit Small Form Factor Pluggable", see www.XFPMSA.org), 300 pin (see www.300pinmsa.org), and XPAK (see www.xpak.org).

Customers are interested in more miniaturized transceivers in order to increase the number of interconnections or port density associated with the network unit, such as, for example, in rack mounted line cards, switch boxes, cabling patch panels, wiring closets, and computer I/O interfaces.

Although these conventional pluggable designs have been used for low date rate applications, the objective of miniaturization often competes with increased data rate which is an ever-constant objective in the industry.

The increasing demand for higher data rates and greater throughput in optical fiber networks has created increased attention on a variety of techniques to modulate and encode digital data signals for transmission on optical fiber. One technique called wavelength division multiplexing (WDM) is the use of multiple wavelengths to carry multiple signal channels and thereby greatly increase the capacity of transmission of optical signals over the installed fiber optic networks. See, for example, Kartalopoulos, DWDM Networks, Devices, and Technology (IEEE Press, 2002).

In a WDM optical system, light from several lasers, each having a different central wavelength, is combined into a single beam that is introduced into an optical fiber. Each wavelength is associated with an independent data signal through the optical fiber. At the exit end of the optical fiber, a demultiplexer is used to separate the beam by wavelength into the independent signals. In this way, the data transmission capacity of the optical fiber is increased by a factor equal to the number of single wavelength signals combined into a single fiber.

In the optical transceiver, demultiplexing devices are typically designed to selectively direct several channels from a single multiple-channel input beam into separate output channels. Multiplexing devices are typically designed to provide a single multiple-channel output beam by combining a plurality of separate input beams of different wavelengths. A multiplexing/demultiplexing device operates in either the multiplexing or demultiplexing mode depending on its orientation in application, i.e., depending on the choice of direction of the light beam paths through the device.

In prior art WDM systems, data carrying capacity may be increased by adding optical channels. Conceptually, each wavelength channel in an optical fiber operates at its own data rate. In fact, optical channels can carry signals at different speeds. In current commercial systems, the use of WDM can push total capacity per fiber to terabits per second, although practical systems are closer to 100 Gbps. Generally, more space is required between wavelength channels when operating at 10 per second than at 2.5 per second, but the total capacities are nonetheless impressive. For example, in the case of four wavelength channels at a data rate per channel of 2.5 gigabits per second, a total rate of 10 gigabits per second is provided. Using eight wavelength channels at a data rate per channel of 2.5 gigabits per second, a total data rate of 20 gigabits per second is attained. In fact, other wavelength channels can be included, for example, 16, 32, 40 or more wavelength channels operating at 2.5 gigabits per second or 10 gigabits per second and allow much higher data throughput possibilities. Furthermore, it is also known in the prior art to use multiple optical fibers in a single cable or conduit to provide even higher transmission rates in a point to point link.

Although high throughput telecommunications networks do not constrain the size of the optical transceiver, optical transceivers for data center applications that use the Ethernet data communications protocol generally conform to IEEE 802.3 standard specifications and MSA form factors. Ethernet (the IEEE 802.3 standard) is the most popular data link network protocol. The Gigabit Ethernet Standard (IEEE 802.3) was released in 1998 and included both optical fiber and twisted pair cable implementations. The 10 GB/sec Ethernet standard (IEEE 802.3 ae) was released in 2002 with optical fiber cabling. Support for and twisted pair cabling was added in subsequent revisions.

The 10 Gigabit Ethernet Standard specifications set forth in the IEEE 802.3ae-2002 supplement to the IEEE 802.3 Ethernet Standard are currently the highest data rate that is standardized under the IEEE 802.3 framework. The supplement extends the IEEE 802.3 protocol and MAC specification therein to an operating speed of 10 Gb/s. Several Physical Coding Sublayers known as 10GBASE-X, 10GBASE-R and 10-GBASE-W are specified, as well as a 10 Gigabit Media Independent Interface (XGMII), a 10 Gigabit Attachment Unit Interface (XAUI), a 10 Gigabit Sixteen-Bit Interface (XSBI), and management (MDIO).

The physical layers specified include 10GBASE-S (R.W), a 850 nm wavelength serial transceiver which uses two multimode fibers. 10GBASE-LX4, a 1310 nm wavelength division multiplexing (WDM) transceiver which uses two multimode or single mode fibers; 10GBASE-L (R/W), a 1310 nm wavelength serial transceiver which uses two single mode fivers, and 10GBASE-E (R/W), a 1550 nm wavelength serial transceiver which uses two single mode fibers.

The 10-Gigabit media types use a variety of letters to represent the fiber optic wavelengths they use as well as the type of signal encoding used.

In the 10GBASE-X media types, an "S" stands for the 850 nanometer (nm) wavelength of fiber optic operation, an "L" stands for 1310 nm, and an "E" stands for 1550 nm. The letter "X" denotes 8B/10B signal encoding, while "R" denotes 66B encoding and "W" denotes the WIS interface that encapsulates Ethernet frames for transmission over a SONET STS-192c channel.

The 10GBASE-SR and 10GBASE-SW physical layer devices are designed for use over short wavelength (850 nm) multimode fiber (MMF). The design goal of these media types is from two meters to 300 meters of fiber distance, depending on the qualities of the fiber optic cable used. The 10GBASE-SR physical layer devices are designed for use over dark fiber, meaning a fiber optic cable that is not in use and that is not connected to any other equipment. The 10GBASE-SW media type is designed to connect to SONET equipment, which is typically used to provide long distance data communications.

The 10GBASE-LR and 10GBASE-LW physical layer devices are designed for use over long wavelength (1310 nm) single-mode fiber (SMF). The design goal of these physical layer devices is transmission from two meters to 10 kilometers (32,808 feet) of fiber distance, depending on cable type and quality (longer distances are possible). The 10GBASE-LR physical layer device is designed for use over dark fiber, while the 10GBASE-LW physical layer device is designed to connect to SONET equipment.

The 10GBASE-ER and 10GBASE-EW physical layer devices are designed with a 1550 nm optical signal for extended reach (40 km) over single-mode fiber (SMF). The design goal of these physical layer devices is transmission from two meters up to 40 kilometers (131,233 feet), depending on cable types and quality (longer distances are possible). The 10GBASE-ER media type is designed for use over dark fiber transmission, while the 10GBASE-EW media type is designed to connect to SONET equipment.

Finally, there is a 10GBASE-LX4 media type, which uses wave division multiplexing technology to send signals over four wavelengths of light carried over a single pair of fiber optic cables. The 10GBASE-LX4 system is designed to operate at 1310 nm over multi-mode or single-mode dark fiber. The design goal for this media system is from two meters up to 300 meters over multimode fiber or from two meters up to 10 kilometers over single-mode fiber, with longer distances possible depending on cable type and quality.

WDM high date rate applications have found widespread application in short reach Ethernet networks The difficulties associated with multi-gigabit signaling over existing wiring has limited the applications for such cabling, although efforts are currently underway for new copper cabling standards.

The use of course wavelength division multiplexing (CWDM) that utilizes just four optically multiplexed channels each transmitting a 3.125 Gb/sec signal over a single fiber pair (i.e. utilizing one fiber for each direction), is set forth in IEEE 802.3ae Clause 53 in the 10GBASE-LX4 Physical Media Dependent (PMD) sublayer. An optical transceiver designed for operating in conformance with such protocol is described in U.S. patent application Ser. No. 10/866, 265, herein incorporated by reference.

SUMMARY OF THE INVENTION

1. Objects of the Invention

It is an object of the present invention to provide a high speed optical transceiver capable of 40 Gbps in a small pluggable standardized form factor.

It is also another object of the present invention to provide a 40 Gbps optical transceiver in a 300-pin form factor or XENPAK form factor for use in an optical fiber transmission system that utilizes WWDM wavelengths typically employed in 10 GBASE-LX4 optical modules.

It is also another object of the present invention to provide an optical transceiver in a form usable for use in a 40 Gbps optical fiber transmission system using industry standard 10GBASE-LX4 wavelengths.

It is still another object of the present invention to provide an optical transceiver for use in an optical wavelength division multiplexed (WDM) transmission system suitable for short range and long haul applications using an SFI-5 or SFI-5.2 electrical interface.

It is still another object of the present invention to provide an optical transceiver for use in an optical wavelength division multiplexed (WDM) transmission system suitable for short range and long haul applications using an SFI-5 or SFI-5.2 electrical interface.

It is still another object of the present invention to provide an optical transceiver using less than 10 watts power dissipation for OC-768 frames.

It is also another object of the present invention to provide an optical transceiver for use in an optical transmission system with different electrical interfaces in a WDM system.

It is still another object of the present invention to provide an optical transceiver for use in an optical wavelength division multiplexed (WDM) transmission system suitable for short range and long haul applications for four 10 Gigabit Ethernet data links.

It is still another object of the present invention to provide an optical transceiver for telecommunications applications utilizing four OC-192 SFI-5 channels.

Some implementations or embodiments may achieve fewer than all of the foregoing objects.

It is also another object of the present invention to provide a low power optical transceiver for use in an optical transmission system with OC-768 channel at 40 Gbps.

2. Features of the Invention.

Briefly, and in general terms, the present invention provides an optical transceiver for converting and coupling an information-containing electrical signal with an optical fiber including a housing having an electrical connector with a plurality of XFI electrical interfaces for coupling with an external electrical cable or information system device and for transmitting and/or receiving an information-containing electrical signal having a data rate at least 10 Gigabits per second on each interface, and a fiber optic connector adapted for coupling with an external optical fiber for transmitting and/or receiving an optical communications signal having a data rate at least 40 Gigabits per second; and at least one electro-optical subassembly in the housing for converting between an information-containing electrical signal and a modulated optical signal corresponding to the electrical signals.

The present invention provides an optical transceiver for converting and coupling an information-containing electrical signal with an optical fiber including a housing including an electrical connector with a 300-pin MSA interface for coupling with an external electrical cable or information system device and a fiber optic connector adapted for coupling with an external optical fiber, at least one electro-optical subassembly in the housing for converting between an information containing electrical signal and a modulated optical signal corresponding to the electrical signal including a transmitter subassembly including first and second lasers operating at different wavelengths and modulated with respective first and second electrical signals for emitting first and second laser light beams, and an optical multiplexer for receiving the first and second beams and multiplexing the respective optical signals into a single multi-wavelength beam.

The present invention further provides an optical transceiver for converting and coupling an information-containing electrical signal with an optical fiber including a housing in a XENPAK form factor including an electrical connector with an XFI electrical interface for coupling with an external electrical cable or information system device and a fiber optic connector adapted for coupling with an external optical fiber, at least one electro-optical subassembly in the housing for converting between an information-containing electrical signal and a modulated optical signal corresponding to the electrical signal including a transmitter subassembly including at least first and second lasers operating at different wavelengths and modulated with respective first and second electrical signals for emitting first and second laser light beams at 10 Gigabits per second on each beam, and an optical multiplexer for receiving the first and second beams and multiplexing the respective optical signals into a single multi-wavelength beam.

Some implementations or embodiments may incorporate or implement fewer of the aspects or features noted in the foregoing summaries.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein.

Figure 1A:
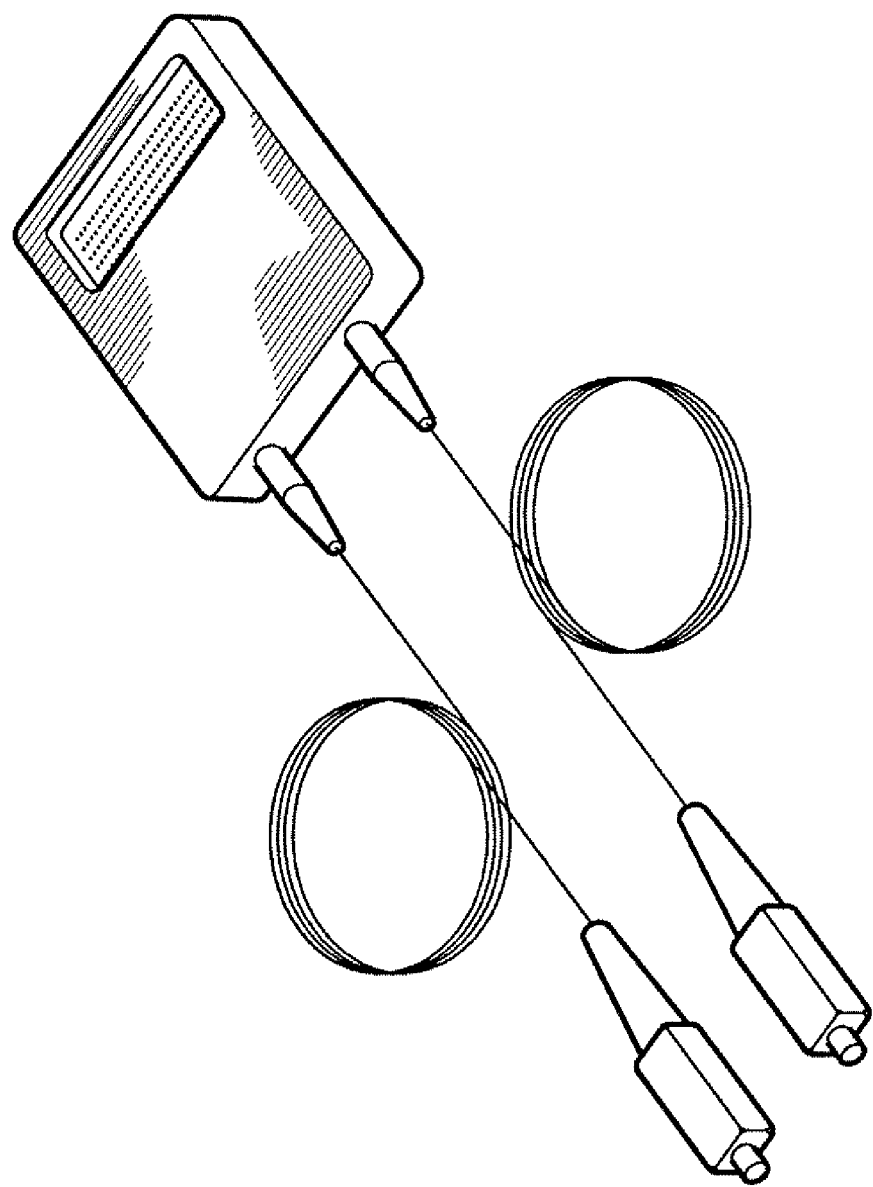
FIG. 1a is a perspective view of an optical transceiver module in which an exemplary embodiment in accordance with aspects of the present invention may be implemented according to the 300-pin MSA.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENT

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments or the relative dimensions of the depicted elements, and are not drawn to scale.

Figure 1B:
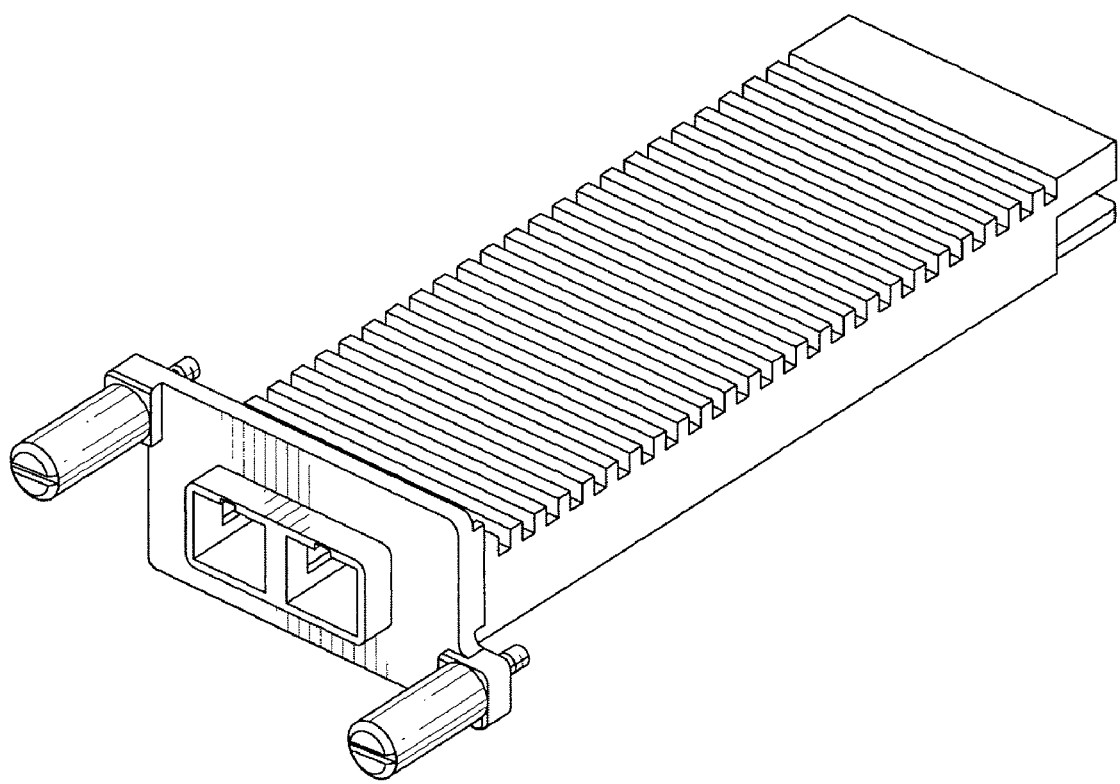
FIG. 1b is a perspective view of an optical transceiver module in which an exemplary embodiment in accordance with aspects of the present invention may be implemented according to the XENPAK MSA.

FIG. 1a and FIG. 1b are perspective views of an optical transceiver module 100 in which an exemplary embodiment in accordance with aspects of the present invention may be implemented. In particular, FIG. 1a depicts the 300-pin MSA form factor, and FIG. 1b depicts the XENPAK form factor.

Figure 2:
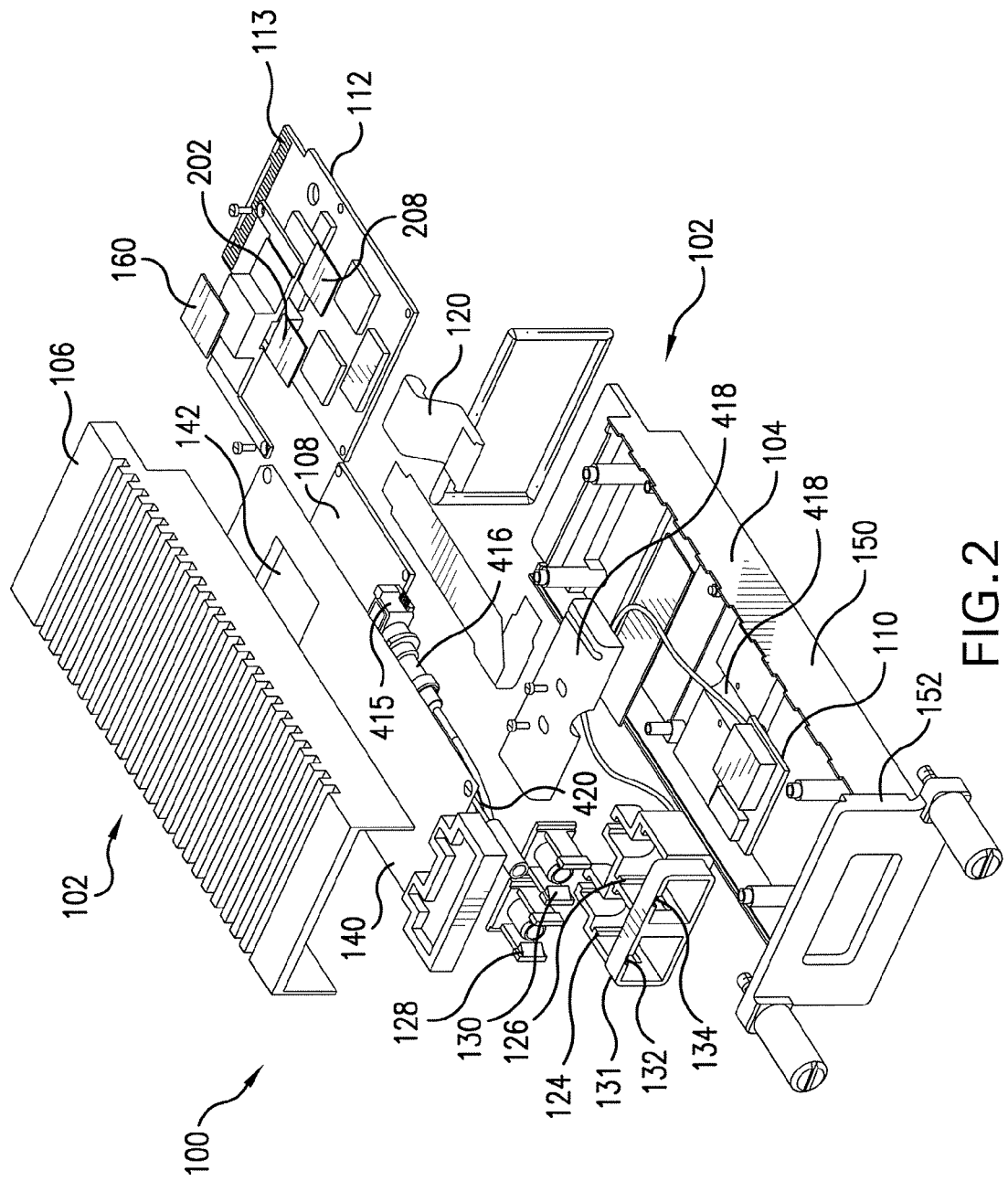
FIG. 2 is an exploded perspective view of an optical transceiver module in which an exemplary embodiment in accordance with aspects of the present invention may be implemented.

Referring now to FIG. 2, there is shown an exploded view of an exemplary pluggable optical transceiver module 100 according to a preferred embodiment of the present invention. In this particular embodiment, the module 100 is similar to the IEEE 802.3ae 10GBASE-LX4 Physical Media Dependent sub-layer (PMD) by having the same laser frequency and is implemented in the XENPAK form factor. It is to be noted, however, that in other embodiments the transceiver module 100 may be configured to operate under various other standard protocols (such as Fibre Channel or SONET) and be manufactured in various alternate form factors. The module 100 is preferably a 100 Gigabit Wide Wavelength Division Multiplexed (WWDM) transceiver having four 10 Gbps distributed feedback lasers that enable transmission of an optical signal at least 300 meters over a single legacy installed multimode fiber or a distance from 10 to 40 km over a single standard single mode fiber.

The transceiver module 100 includes a two-piece housing 102 including a base 104 and a cover 106. In addition, contact strips (not shown) may be provided to ground the module to an external chassis ground as well. The housing 102 is constructed of die-case or milled metal, preferably die-cast zinc, although other materials also may be used, such as specialty plastics and the like. Preferably, the particular material used in the housing construction assists in reducing EMI.

The front end of the housing 102 includes a faceplate 131 for securing a pair of receptacles 124, 126. The receptacles 124, 126 are configured to receive fiber optic connectors (not shown) which mate with optical plugs 128, 130 respectively. In the preferred embodiment, the connector receptacles 124, 126 are configured to receive industry standard LC duplex connectors. As such, keying channels 132, 134 are provided to ensure that the LC connectors are inserted into the receptacles 124, 126 in their correct orientation. Further, as shown in the exemplary embodiment and discussed further herein, the connector receptacle 124 is intended for an LC transmitter connector, and the connector receptacle 126 receives an LC receiver connector.

In one embodiment, the housing 102 holds three subassemblies or circuit boards, including a transmit board 108, a receive board 110, and a physical coding sublayer (PCS)/physical medium attachment (PMA) board 112, which is used to provide an electrical interface to external computer or communications units (not shown). The transmit subassembly includes four distributed feedback (DFB) semiconductor lasers which may be mounted in a single, hermetically sealed enclosure 415, which interfaces to a fiber coupling subassembly 416. The transmit board 108 is secured in place at the bottom of the housing a brace 418 attached to the coupling subassembly 416. The brace also functions as a heat sink for dissipating heat from the metallic fiber coupling subassembly 416. In addition, the transmit board 108 and receive board 110 are connected to the PCS/PMA board 112 by respective flex interconnects 120, or other board-to-board electrical connectors or cables. Thermally conductive gap pads may be provided to transmit the heat generated by the lasers or other components in the transmitter subassembly to the base 104 or cover 106 of the housing, which acts as a heat sink. The receiver subassembly 110 is directly mounted on the housing base 104 using a thermally conductive adhesive to achieve heat dissipation. Different subassemblies therefore dissipate heat to different portions of the housing for a more uniform heat dissipation. The output optical signal from the four lasers is multiplexed and input into a single optical fiber 420 which coils and reverses direction, and is preferably attached or mounted on a flexible substrate 140. The flexible material may be an optical flexible planar material such as FlexPlane™ available from Molex, Inc. of Lisle, Ill., although other flexible substrates may be used as well. The optical fiber 420 originating from the transmitter subassembly is thereby routed to the transmit optical connector plug 130, which is attached to the housing 102. The fiber is routed and attached in such a manner as to minimize sharp bends in the optical fiber to avoid optical loss and mechanical failure.

The flexible substrate 140 may include an opening 142 or hole in a portion of the material that is located directly above the retimer IC or other heat generating components mounted on the PCS/PMA board 112. The opening 142, which is substantially an area the size of the unused portion of the substrate 140, enables the heat sink on the cover 106 to contact a heat conductive gap pad 160, so as to provide access and a heat conductive path to the mounted components on the board 112. This area on the board 112 normally would be inaccessible if not for the opening 142. For example, a heat sink may be installed without interfering with the routing of the optical fibers on the substrate 140 and without removing the mounted substrate 140 to allow access to the PCS/PMA board 112.

Figure 3:
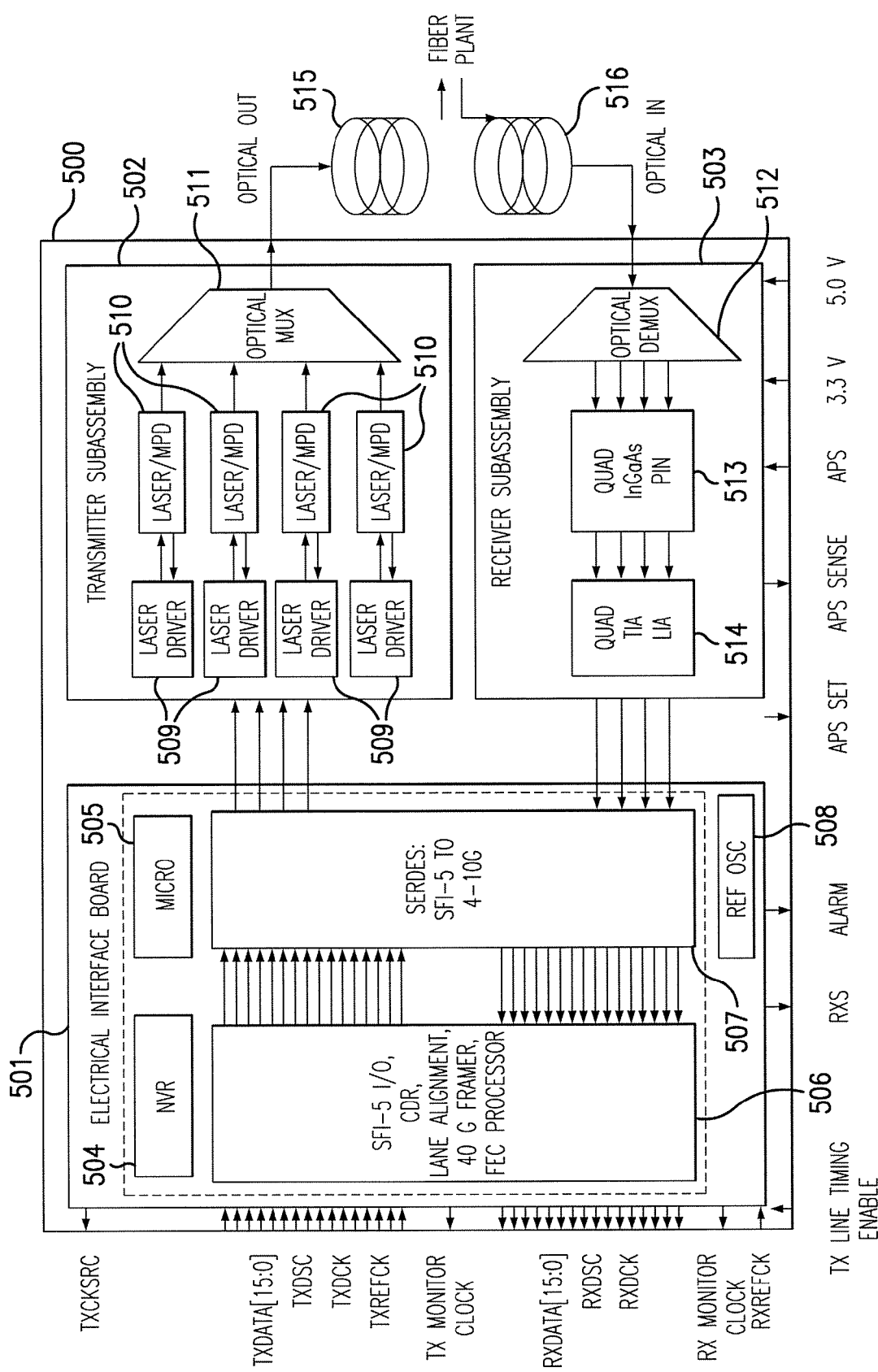
FIG. 3 is a block diagram of the optical transceiver according to the present invention.

FIG. 3 is a highly simplified block diagram of the optical transceiver 500 according to the present invention. In particular, there is depicted the electrical interface board 501, the transmitter subassembly 502, and the receiver subassembly 503. The left side of the figure depicts the electrical input and output which is represented by a plurality of serial data signal lines TXDATA and RXDATA, and various clock and control lines.

A variety of different serial data formats are used in fiber optic systems. The Optical Internetworking Forum (OIF) has defined a 40 Gb/s interface known as Serdes Framer Interface Level 5 (SFI-5) with sixteen (16) data lanes and one lane, each lane running at a data rate between 2.5 and 3.125 Gbps.

The term "Serdes" is an acronym that refers to SERialization and DESerialization. The SFI-5 standard defines the interface between a Serdes component, a forward error correction unit, and a framer, as would be used in a communications unit in an optical network.

The motivation for the standard relates to the fact that data signals may encounter different delays in transit from the SFI-5 source device to the SFI-5 sink device. The earliest arriving signal may lead the latest arriving one by n bits where n is some integer. Relative to the earliest, each of the remaining signals is coincident, or is up to n unit intervals late. The search space for determining the relative delays of all 17 signals on SFI-5 is (n+1), sup. 17 combinations. The deskew lane in the SFI-5 interface serves as a signal reference lane to allow each of the 16 data lanes to independently measure its own delay relative to the reference signal.

The electrical interface board 501 includes an NVR 504, a microprocessor 505, and the SFI-5 signal processing circuit 506. The circuit 506 consists of the SFI-5 I/O circuitry, a clock data recovery (CDR) circuit, lane alignment circuits, a 40G framer, and a forward error correction (FEC) processor.

The next circuit component 507 on the interface board 501 converts the SFI-5 signals to four 10G signals, and vice versa, which are transferred to and from the transmitter subassembly 502, and the receiver subassembly 503. A reference oscillator 508 is also present on the interface board 501.

The transmitter subassembly 502 includes a sequence of laser drivers 509 which function to drive a sequence of lasers 510, each laser having a different wavelength. The output of the lasers 510 is then fed into an optical multiplexer 511, which combines the optical signals into a single composite optical signal or beam which is input into the optical fiber 515.

The receiver subassembly 503 is connected to an incoming fiber 516. The optical input is applied to an optical demultiplexer 512 which separates the multifrequency incoming beam into separate optical signals at different frequencies, in this case, four frequencies. The optical signals are then applied to four InGaAs PIN photodiodes 513. The photodiodes 513 are connected to an amplifier/limiter circuit 514, including a transimpedance amplifier (TIA). The output of circuit 514 is then connected to circuit component 507 on interface board 501.

Various modifications and improvements of the present invention may also be apparent to those of ordinary skill in the art. Thus, the particular combination of sensors and data storage elements described and illustrated herein is intended to represent only certain embodiments of the present invention, and is not intended to serve as limitations of alternate devices within the spirit and scope of the invention. Various aspects of the techniques and apparatus associated with the sensing, processing, storing and reporting aspects of the invention may be implemented in a digital circuitry, or in computer hardware, firmware, software, or in combinations of them. Apparatus of the invention may be implemented in dedicated digital logic circuitry tangibly embodied in the module, or in a machine-readable storage device for use by a programmable processor, or in software located in memory along with communications processing software used in operation of the module. The foregoing techniques may be performed, for example, single central processor, a multiprocessor, on one or more digital signal processors, gate arrays of logic gates, or hardwired logic circuits for executing a sequence of signals or program of instructions to perform functions of the invention by operating on input data and generating output. The methods may be advantageously implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include by way of example, both general and special purpose microprocessors. Generally, a processor will receive instructions and date from read-only memory and/or random access memory. Storage devices suitable for tangibly embodying computer program instruction and date include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specifically designed application-specific integrated circuits (ASICS).

It will be understood that each of the elements described above, or two or more together, also may find a useful application in other types of constructions differing from the types described above.

While the invention has been illustrated and described as embodied in a transceiver for an optical communications network, it is not intended to be limited to the details shown, since various modifications and structural changes may be made without departing in any way from the spirit of the present invention.

Without further analysis, from the foregoing others can, by applying current knowledge, readily adapt the present invention for various applications. Such adaptations should and are intended to be comprehended within the meaning and range of equivalence of the following claims.

The invention claimed is:

1. An optical transceiver for converting and coupling an information-containing electrical signal with an optical fiber comprising:
   a housing including a base and a cover;
   an electrical interface subassembly in the housing with a plurality of XFI electrical interfaces for coupling with an external electrical cable or information system device and for transmitting and/or receiving an information-containing electrical signal having a data rate of at least 10 Gigabit per second on each interface, the electrical interface assembly comprising an SFI-5 signal processing circuit for converting between the information-containing electrical signal and a plurality of SFI-5 signals and a Serdes for converting between the plurality of SFI-5 signals and a plurality of electrical signals having a data rate of at least 10 Gigabit per second;
   a fiber optic connector in the housing and adapted for coupling with an external optical fiber for transmitting and/or receiving an optical communications signal having a data rate of at least 40 Gigabit per second;
   a transmitter subassembly in the housing for converting the plurality of electrical signals from the Serdes to an optical signal having a data rate of at least 40 Gigabit per second provided to the fiber optic connector; and
   a receiver subassembly in the housing for converting an optical signal having a data rate of at least 40 Gigabit per second from the fiber optic connector to corresponding electrical signals provided to the Serdes.

2. A transceiver as defined in claim 1, wherein the transmitter subassembly includes at least first and second lasers operating at different wavelengths and modulated with respective first and second electrical signals from the Serdes for emitting first and second laser light beams; and an optical multiplexer for receiving said first and second beams and multiplexing the respective optical signals into a single multi-wavelength beam that is coupled to said fiber optic connector for transmitting the optical signal to an external optical fiber.

3. A transceiver as defined in claim 1, wherein the receiver subassembly includes an optical demultiplexer coupled to said fiber optic connector for receiving a multi-wavelength optical signal having a plurality of information-containing signals each with a different predetermined wavelength and demultiplexing the optical signal into distinct optical beams corresponding to said predetermined wavelengths.

4. A transceiver as defined in claim 1, wherein said housing conforms to the 300-pin Multi Source Agreement.

5. A transceiver as defined in claim 1, wherein said housing conforms to the XENPAK Multi Source Agreement.

6. A transceiver as defined in claim 1, wherein said transmitter subassembly produces an optical signal compliant with IEEE 802.3ae 10GBASE-LX4.

7. A transceiver as defined in claim 2, wherein the transmitter subassembly includes a hermetically sealed unit including a plurality of semiconductor lasers mounted on a common support and arranged so that the emitted beams from said lasers are substantially parallel.

8. An optical transmitter for converting and coupling an information-containing electrical signal with an optical fiber comprising:

a housing including an electrical connector with an SFI-5 electrical interface for coupling with an external electrical cable or information system device and for transmitting and/or receiving an information-containing electrical signal having a data rate of at least 10 Gigabit per second on each interface, and a fiber optic connector adapted for coupling with an external optical fiber for transmitting and/or receiving an optical communications signal having a data rate of at least 40 Gigabit per second; and at least one electro-optical subassembly in the housing for converting between said plurality of 10 Gigabit per second signals and a modulated optical signal corresponding to the electrical signals including:

an electrical interface assembly comprising a reference oscillator, a microprocessor, an SFI-5 signal processing circuit including SFI-5 input/output circuitry, a clock data recovery circuit, lane alignment circuits, a framer and a forward error correction processor for converting between the information-containing electrical signal and a plurality of SFI-5 signals, and a Serdes for converting between the plurality of SFI-5 signals and the plurality of 10 Gigabit per second signals; and a transmitter subassembly including at least first and second lasers operating at different wavelengths and modulated with the plurality of 10 Gigabit per second signals from the Serdes for emitting first and second laser light beams, and an optical multiplexer for receiving said first and second beams and multiplexing the respective optical signals into a single multi-wavelength beam that is coupled to said fiber optic connector for transmitting the optical communications signal to an external optical fiber, at the data rate of at least 40 Gigabit per second.

9. A transceiver as defined in claim 8, wherein one of said electro-optical subassemblies is a receiver subassembly including an optical demultiplexer coupled to said fiber optic connector for receiving a multi-wavelength optical signal having a plurality of information-containing signals each with a different predetermined wavelength and demultiplexing the optical signal into distinct optical beams corresponding to said predetermined wavelengths.

10. A transceiver as defined in claim 9 wherein said receiver subassembly comprises an array of individual photodetectors and wherein the optical multiplexer includes an optical block with a plurality of wavelength selecting elements and reflectors operative to direct the optical beams from each respective wavelength selecting element to respective ones of a plurality of spatially separated image positions corresponding to the locations of discrete photodetectors.

11. A transceiver as defined in claim 8, wherein the housing includes a base member and a cover member forming a 300 pin pluggable module.

12. A transceiver as defined in claim 8, the electro-optical subassembly is compliant with IEEE 802.3ae 10GBASE-LX4.

13. A transceiver as defined in claim 1, further comprising a thermally conductive gap pad interposed between the electrical interface subassembly and the housing for transmitting heat generated by the electrical interface subassembly to the housing.

14. A transceiver as defined in claim 1, further comprising a fiber coupling subassembly including an optical fiber for carrying the optical signal from the transmitter subassembly to the fiber optic connector.

15. A transceiver as defined in claim 1, wherein the electrical interface subassembly, the transmitter subassembly and the receiver subassembly are on different circuit boards.

16. A transceiver as defined in claim 1, wherein the SFI-5 signal processing circuit comprises SFI-5 input/output circuitry, a clock data recovery circuit, lane alignment circuits, a framer and a forward error correction processor.

17. A transceiver as defined in claim 3, wherein the receiver subassembly comprises a plurality of photodiodes and a transimpedance amplifier for converting the distinct optical beams from the optical demultiplexer to corresponding electrical signals provided to the Serdes.

18. A transceiver as defined in claim 8, further comprising a thermally conductive gap pad interposed between the electrical interface subassembly and the housing for transmitting heat generated by the electrical interface subassembly to the housing.

19. A transceiver as defined in claim 8, further comprising a fiber coupling subassembly including an optical fiber for carrying the single multi-wavelength beam from the transmitter subassembly to the fiber optic connector.

20. A transceiver as defined in claim 9, wherein the receiver subassembly comprises a plurality of photodiodes and a transimpedance amplifier for converting the distinct optical beams from the optical demultiplexer to corresponding electrical signals provided to the Serdes.

* * * * *